United States Patent [19]
Wiesner et al.

[11] 3,972,693
[45] Aug. 3, 1976

[54] PROCESS FOR THE TREATMENT OF PHENOL-CONTAINING WASTE WATER FROM COAL DEGASSING OR GASIFICATION PROCESSES

[75] Inventors: Paul Wiesner, Oberursel; Fritz Wöhler; Hans-Martin Stönner, both of Frankfurt am Main, all of Germany

[73] Assignee: Metallgesellschaft Aktiengesellschaft, Frankfurt am Main, Germany

[22] Filed: June 6, 1973

[21] Appl. No.: 367,387

[30] Foreign Application Priority Data
June 15, 1972  Germany.............................. 2229213

[52] U.S. Cl. ..................................... 55/42; 55/44; 55/54; 55/68; 55/70; 55/73
[51] Int. Cl.² ........................................ B01D 19/00
[58] Field of Search ............... 55/37, 42, 44, 53, 54, 55/68, 70, 73

[56] References Cited
UNITED STATES PATENTS

| | | | |
|---|---|---|---|
| 3,292,345 | 12/1966 | Wunderlich et al. ............... | 55/70 X |
| 3,335,071 | 8/1967 | Bollen et al. ....................... | 55/70 X |
| 3,404,072 | 10/1968 | Bollen et al. ....................... | 55/70 X |
| 3,594,987 | 7/1971 | Oda et al. ........................... | 55/70 X |

Primary Examiner—Charles N. Hart
Assistant Examiner—Richard W. Burks
Attorney, Agent, or Firm—Karl F. Ross; Herbert Dubno

[57] ABSTRACT

Dissolved organic compounds in waste water resulting from coal degassing or gasification processes are removed by extraction with a solvent which is substantially water-immiscible, the solvent residues in the waste water are removed by inert gas scrubbing, and $CO_2$, $H_2S$ and $NH_3$ in the waste water are removed by heating and steam contacting. $NH_3$ is effectively removed in a steam gas/liquid contacting column by feeding the condensed head product of the column back to the top portion thereof, withdrawing a portion of the condensate from the column at a level intermediate the top and bottom portions of the column, treating the condensate in admixture with waste water containing $CO_2$, $H_2S$ and $NH_3$ in a deacidification gas/liquid contacting column, and feeding the sump product of the deacidification column to the first column at a region below the region at which the condensate is withdrawn but intermediate the top and bottom portions of the $NH_3$-removal column.

2 Claims, 2 Drawing Figures

3,972,693

PROCESS FOR THE TREATMENT OF PHENOL-CONTAINING WASTE WATER FROM COAL DEGASSING OR GASIFICATION PROCESSES

FIELD OF THE INVENTION

Our present invention relates to waste waters resulting from the degassing or gasification of coal and other carbonaceous materials and, more particularly, to a process for the treatment of such waste waters.

BACKGROUND OF THE INVENTION

These waste waters contain substantial amounts of dissolved organic compounds, $CO_2$, $H_2S$ and $NH_3$ which must be removed in several steps before the waste waters can be discharged to conventional treatment devices or to rivers or other receiving streams.

The dissolved organic compounds are phenols and other oxygen-containing compounds such as ketones and aldehydes, and also aliphatic carboxylic acid (fatty acids), which are particularly common in waste waters from the lignite gasification or degassing process. Other dissolved organic compounds are nitrogen-containing compounds, such as pyridine decomposition products, and also sulfur compounds. The dissolved inorganic compounds are mainly gases e.g. $CO_2$, $H_2S$ and $NH_3$.

It is known that the dissolved organic compounds in such waste waters can be extracted with water-immiscible or substantially water-immiscible solvents. Suitable solvents are e.g. benzene, tricresyl phosphate, or diisopropyl ether. When a waste water has been extracted with a solvent, the residual impurities of the waste water are small amounts of solvent and the volatile inorganic compounds mentioned above. These residual impurities can be removed by contacting the water with steam.

Waste water which has been freed from ammonia can be treated in a conventional waste water treatment device characterized by a biological or a mechanical treatment step or discharged in a river course or other disposal system.

Various processes for the treatment of waste waters have been used for many years and have proved to be quite reliable and adaptable to varying conditions and the properties of the treated waste waters. However, waste waters of the processing of lignite may contain substantial amounts of fatty acids. These compounds cannot be satisfactorily extracted during the extraction of organic compounds with a solvent and remain in phenol-free waste waters and bind the ammonia present in such waste waters. Lime milk, sodium carbonate or the like can be added to the neutralized waste water to make it alkaline to such an extent that the ammonia present in the waste water is freed and can be removed.

These known processes meet environmental requirements but are too expensive and complicated, especially as far as the the ammonia removal is concerned. The reason for this is that ammonia is removed in a single step in the known gas/liquid contacting systems and therefore can be found in the head product of a contacting column only in small concentrations. Hence, the use of sulfuric acid has been necessary to bind the ammonia and precipitate it as ammonium sulfate.

Efforts have been made to obtain higher concentrations of ammonia in the head product of a contacting column by the use of refluxing in an extra column portion. However, it has been found repeatedly that then a zone of higher concentration of $CO_2$ is also established, which can lead to a flooding in this zone of the column. The high concentration of $CO_2$ in this zone can also lead to a high concentration of $CO_2$ in the head product which, in turn, can lead to crystal deposits of ammonium carbonate in the condenser and in its inlet and outlet portions, especially in the coldest areas thereof. Such deposits can ultimately result in obstruction of the passageways.

OBJECTS OF THE INVENTION

The main object of the present invention is to provide a process by which the disadvantages mentioned above can be eliminated.

Another object of the present invention is to provide a process by which $NH_3$, $CO_2$ and $H_2S$ can be removed from waste waters from processes for the gasification or degassing of carbonaceous materials in an efficient and economical manner.

Another object of the present invention is to obtain a substantially increased ammonia concentration in the head product of the column used for scrubbing ammonia without any concomitant disadvantages.

SUMMARY OF THE INVENTION

These objects and others which will become apparent hereinafter are achieved, in accordance with our present invention, by a process comprising the steps of extracting the organic compounds from a waste water with a substantially water-immiscible solvent, removing the solvent residues from the waste water, and removing $NH_3$ from the waste water in counterflow with steam in a gas/liquid contacting column, condensing the head product of the column, feeding the condensate to the top portion of the column, and withdrawing the condensate from the column at a level intermediate the top and bottom portions of the column.

A substantial increase in the concentration of ammonia in the head product from the contacting column can be achieved if the column is provided with an extension at the top thereof. Condensate of the head product which is fed to the top portion of this extension can be withdrawn at a level in the region of the bottom portion of this extension and be deacidified before it is refed to the column for further removal of ammonia. The condensate can be deacidified together with waste which has not yet been treated in the column for ammonia removal. We have also found it to be advantageous to add cold water at the top of the extension and withdraw the added water and the condensate together at a level in the region of the bottom of the extension. Such added water can also be added as a partial replacement of the condensate; it may be desirable to reflux only a portion of the condensate of the head product from the column.

According to another embodiment of the invention, the cleaning of the refluxed condensate in the extension portion of the column can be facilitated with waste water which has not been deacidified. Waste water is fed to the column at a level above the level from which the condensate is withdrawn and intermediate the top and bottom portions of the extension portion. Such waste water is withdrawn from the column together with the condensate at a level in the area of the bottom of the extension. With such an arrangement, the device used in the deacidification step of the treatment process can be regarded as a true continuation of the ammonia-removal column.

It is advantageous for both aforementioned embodiments of the invention to remove solvent residues from the extracted waste waters before the deacidification by passing therethrough an inert gas, e.g. flue gas, at a relatively low temperature. The solvent residues can for instance be recovered by washing the inert gas with the extract which has been obtained by the extraction treatment of the waste waters. Thus the inert gas can in a known manner be circulated through the solvent residue-scrubbing column and the extract washer; the solvent recovery can be coordinated with the phenol or organic compound extraction in a simple and advantageous manner.

The present invention relates particularly to a process for the treatment of waste waters resulting from degassing or gasification of carbon products by extraction of therein dissolved organic compounds by means of a substantially water-immiscible solvent, by removal of the solvent residues in the extracted waste water and finally by the removal of $CO_2$, $H_2S$ and $NH_3$ dissolved in the waste water by steam.

Ammonia is removed from the extracted water in a multiple-tray contacting column provided, as described, with a column extension on the top thereof. The condensate of the head product of the column is fed to the top of the extension column above the upper set of trays and is withdrawn from a level of the column in the area of the bottom of the extension column below the upper set of trays but above the lower set of contacting trays at an intermediate collecting tray.

The withdrawn condensate can be added to waste water which has not been neutralized. The waste water and the condensate are deacidified in a step prior to continued ammonia removal in the gas/liquid contacting column. The condensate withdrawn from the ammonia-removal column can, for instance, be added to the waste water fed to the deacidification column.

Waste water which has been extracted, according to another embodiment of the invention, can also be added to the ammonia-removal column at a level situated e.g. between two and eight contacting stages or trays (bottoms) above the level of the column from which the condensate is withdrawn. The added waste water and the refluxed condensate mix in the column or rather in the ammonia-concentrating extension portion of the column and can be withdrawn together and fed to a deacidification column. The latter column can also be formed with a multiplicity of levels, trays or bottoms. The sump product of the deacidification column is fed to the ammonia-removal column at a level below the level from which the mixture of waste water and condensate is withdrawn. Hence, the deacidification step is accomplished in a genuine side column of the ammonia-removal column.

It is however necessary, according to the invention, that the solvent residues remaining in the waste waters after the extraction step be removed before the gaseous impurities are removed. The removal of the solvent residues is advantageously accomplished by blowing an inert gas, e.g. nitrogen, preferably with flue gas, through the water resulting from the extraction step. The temperature of the water is adjusted to between 50° and 60°C before the treatment with the gas. Part of the $CO_2$ and $H_2S$ in the water can thereafter be removed by heating the water to a temperature above 90°C.

SPECIFIC DESCRIPTION

Figure 1:
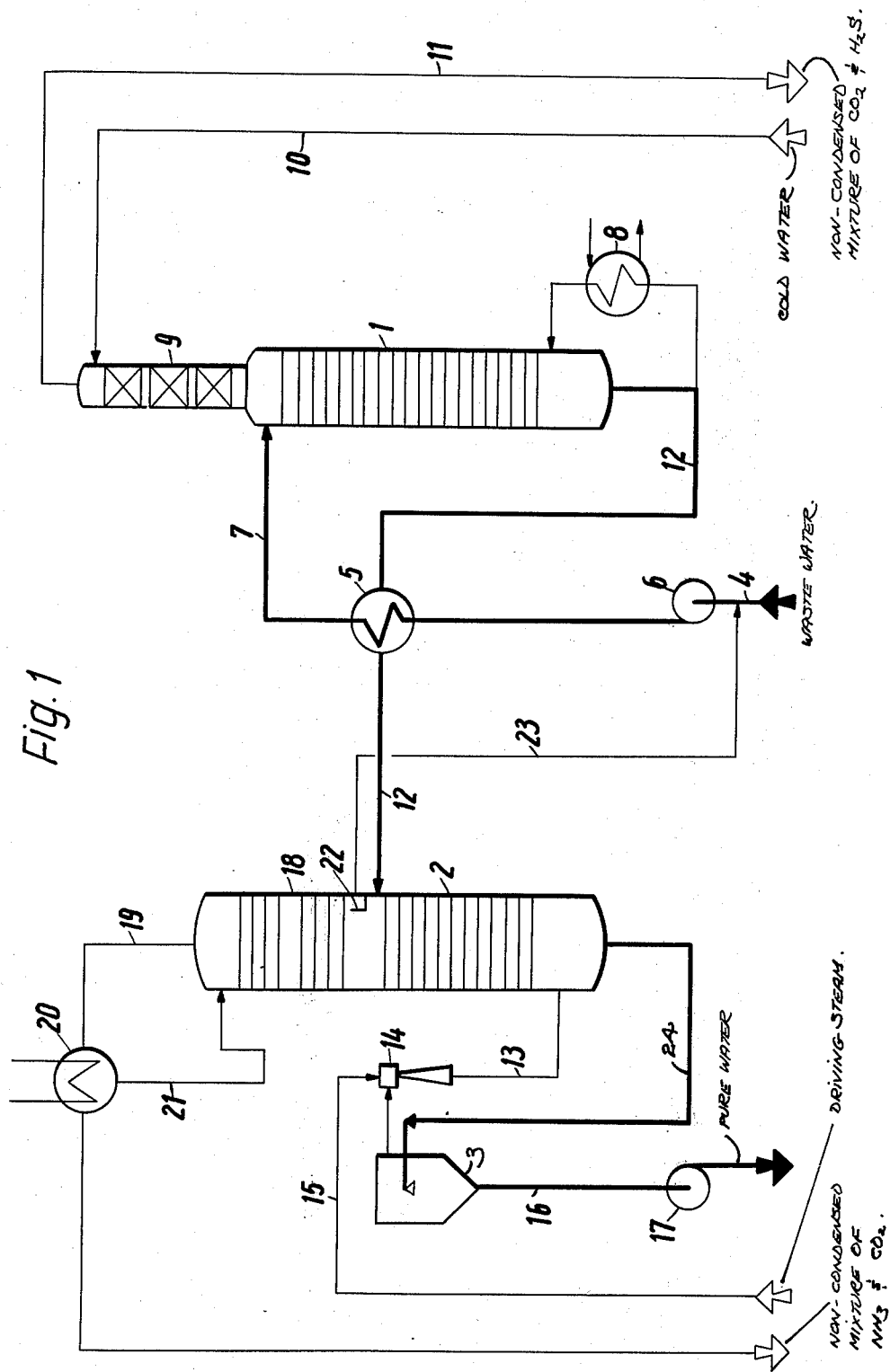
FIGS. 1 and 2 are flow diagrams illustrating the invention.

In the embodiment, according to FIG. 1, a deacidification column and an ammonia-removal column are connected in series.

Figure 2:
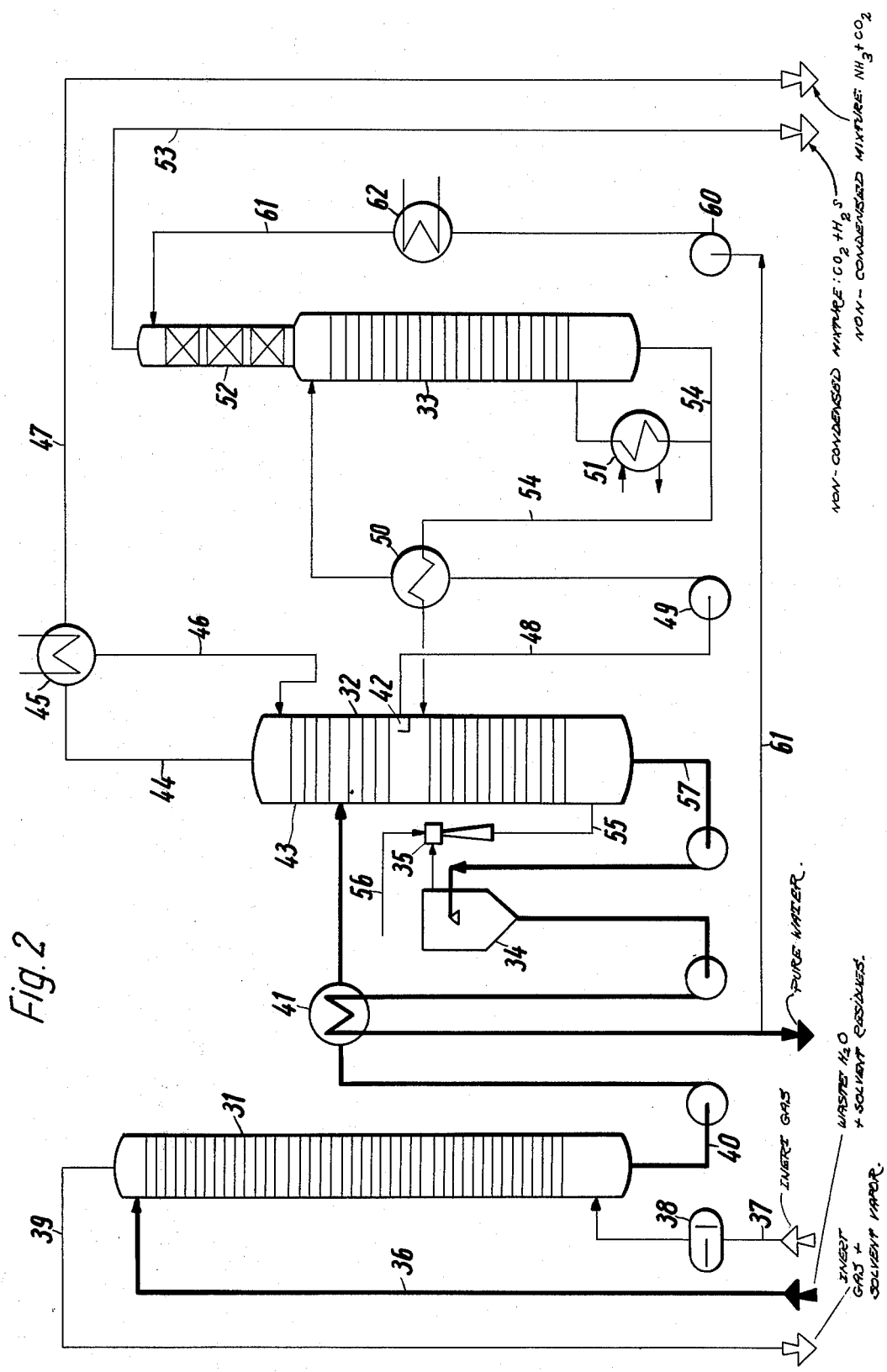

In the embodiment, according to FIG. 2, a deacidification column and an ammonia-removal column are arranged as true side columns, with parallel connection. This diagram also shows a column for solvent recovery.

The arrangement according to FIG. 1 consists essentially of the deacidification column 1, the ammonia-removal column 2, and the expansion cooler 3. The columns are of the multiple bottom or tray type provided with weirs over which the liquid flows downwardly and with bubble caps or the like through which steam passes upwardly.

Waste water which has been freed from organic compounds by solvent extraction and freed from solvent residues in a scrubbing column (see FIG. 2), is fed through the conduit 4 and the heat exchanger 5 by means of the pump 6 to the inlet 7 of the pressurized deacidification column 1. The sump product of this column is indirectly heated by means of the boiler 8, e.g. by steam, so that steam passes upwardly through the column. The removed steam and other vapors, to a great extent containing the gaseous impurities of the waste water, are washed with a small amount of water in the reflux zone or scrubber 9 mounted on the top of the deacidification column 1. The cold water is fed to the reflux zone 9 through the conduit 10. The ammonia in the steam is washed down into the column 1. Cleaned and cooled water resulting from the treatment of the invention can be used as this wash water. The head product of the deacidification column 1 flows through the conduit 11 and is a mixture of $CO_2$ and $H_2S$, containing almost no $NH_3$. This mixture can be converted, for instance, to sulfuric acid, in a known manner. $CO_2$ may be released as waste gas.

The sump product of the pressurized column 1 which is a substantially deacidified, hot waste water, is led through the conduit 12 and the heat exchanger 5 to the inlet of the ammonia-removal gas/liquid contacting column 2. The steam, which is necessary for driving off of the ammonia and is fed through the conduit 13 into the bottom portion of the column 2, just above the sump, can be produced partially by the cooling of the water which is removed from the column 2 by evaporation under reduced pressure in the evaporative or expansion cooler 3. The reduced pressure is obtained by means of a jet (venturi) pump 14, which obtains its driving steam through the conduit 15. The steam discharge of the jet pump 14 is delivered through the conduit 13 to the column 2.

Purified and cooled water is removed by suction from the evaporative cooler 3 through the conduit 16 by means of the pump 17 and conveyed at ambient pressure to a conventional (e.g., biological) waste water treatment device or arrangement or may be discharged directly into a river course.

Above the inlet portion of the column 2 (i.e., above the conduit 12) the steam enters the ammonia-concentrating portion 18 of the column 2 (upper set of trays) and is here washed with the condensate obtained by the condenser 20 from the head product removed from the top portion of the extension portion 18 by conduit 19 and cooled in the condenser. The condensate is fed as a reflux to the top portion of the extension portion 18, from the condenser 20 through the conduit 21. It is then withdrawn from the level 22 of the column 2, fed through the conduit 23 and mixed with the waste water which is fed through the conduit 4.

The non-condensed head product which is a humid mixture of $NH_3$ and $CO_2$ flows from the condenser 20. The content of ammonia of this mixture is so high that it can be converted to nitrogen and steam if mixed with air. However, the content of $CO_2$ in this mixture is small, because of the deacidification process in the column 1. Thus, a precipitation of ammonium carbonate in the top portion of the extension portion 18, in the conduit 19 and the condensor 20 cannot result.

The sump product of the column 2 has a temperature of between 95° and 105°C, depending on the pressure maintained in the column 2. It is fed into the evaporative cooler 3 through the conduit 24.

FIG. 2 shows a scrubbing column or tower for the removal of residual amounts of solvent in the extracted water. The ammonia removal is accomplished in a main column and the deacidification in another column, arranged as a parallel-connected column to the main column.

More specifically, the flow scheme of FIG. 2 comprises the scrubbing column 31 for the removal of solvent residues, the main column 32 for the ammonia-removal step and the side column 33 for the deacidification step. The steam consumption of the main column 32 is met by cooling the discharge of the main column 32 and vaporizing it under reduced pressure in the evaporative cooler 34 by means of the steam-operated jet pump 35.

Waste water which results from the extraction device is fed through the conduit 36 to the top portion of the scrubbing column 31 and cleaned with inert gas, which is fed through the conduit 37 by the gas blower 38 into the sump portion of the column 31. The inert gas which becomes saturated with solvent vapor is removed from the top portion of the column 31 and flows through the conduit 39 to a solvent recovery device which is not shown in FIG. 2. The solvent vapor can, for instance, be scrubbed from the inert gas with a portion of the phenolic oils which result from the phenol extraction. The phenolic oils and the removed solvent are fed to the solvent recovery section of the extraction plant.

The sump product of the scrubbing column 31, which is freed of solvent is fed through the conduit 40 and a heat exchanger 41 to the main column 32 at a level substantially above the level from which the refluxed condensate flowing through the extension portion is withdrawn from the column 32.

The head product of the main column 32 is rich in $NH_3$ but contains also $CO_2$ in addition to steam and flows through the conduit 44 to the condensor 45. Water forms in the condensor 45 and flows as reflux in the conduit 46 to the top portion of the main column 32. Noncondensed components of the head product, namely a moist mixture of $NH_3$ and $CO_2$, are removed through the conduit 47.

By feeding the waste water through the conduit 40 to the main column 32 at a level above the level 42 for the withdrawal of the reflux condensate and the waste water, the main column 32 is provided with additional scrubbing possibilities, in a zone, through which the waste water feed as well as the reflux condensate flow. The mixture of these two components is conveyed from the level 42 through the conduit 48, through the heat exchanger 50, and to the pressurized side column 33, by means of the pump 49. The sump product of the side column 33 is heated indirectly by means of steam-operated heaters 51. The acid gases removed from the side column 32 pass an aftertreatment zone 52 mounted on the top of the column 33 and are there treated with cold water, so that a head product containing only $CO_2$ and $H_2S$ is removed through the conduit 53.

The hot sump product in the side column 33 is fed through the conduit 54 and the heat exchanger 50 to the main column 32 at a level below the level 42 for the withdrawal of the mixture of the condensate and the waste water and is scrubbed in the lower portion of the column 32 with the steam fed to this portion through the conduit 55. This steam is produced mainly in the evaporative cooler 34 and conveyed by means of the steam jet 35. The driving steam flowing through the conduit 56 conveys the steam from the evaporative cooler 34 through the conduit 55 to the sump portion of the main column 32.

The sump product of the column 32 is deacidified and $NH_3$-free water which is removed through the conduit 57, the evaporative cooler 34 and the heat exchanger 41. A branch current of this cleaned water can be fed to the aftertreatment zone 52 of the side column 33 by means of the pump 60, through the conduit 61 and the cooler 62.

SPECIFIC EXAMPLES

The present invention will now be further illustrated in the following examples. A waste water resulting from the pressurized gasification of soft coal with oxygen and air is charged to a treatment arrangement in both examples. The extractible organic impurities, especially phenolic compounds, are extracted with diisopropyl ether. Solvent residues in the extracted waste water are removed as described in the foregoing with an inert gas at the temperature of the extracting device, the extractor.

Waste water which has been thus extracted and freed from solvent residues contains 0.8 weight percent ($CO_2$ + $H_2S$) and 1.2 weight percent $NH_3$, which can be removed by the special treatment of the present invention. Such waste water has a temperature of about 60°C after the removal of the solvent residues.

EXAMPLE 1

100 m³ extracted waste water from which the solvent residues have been removed is fed to the treatment arrangement, according to FIG. 1, through the conduit 4 and at a temperature of 60°C. It is conveyed by means of the pump 6 through the heat exchanger 5 to the inlet portion 7 of the deacidification column 1 and has a temperature of about 95°C at this point. The column 1 is pressurized with a pressure of about 6 atm., and the temperature of its sump portion is kept at a temperature of 150°C by means of the heater 8. The steam consumption of the heater 8 is 4100 kg steam having a temperature of 165°C. 5 m³ of cold water having a temperature of about 40°C are added to the top portion of the aftertreatment zone 9 of the column 1. The head product in the conduit 11 consists, after condensation of traces of steam of 600 kg ($CO_2$ + $H_2S$), which is about 75% of the total amount of these compounds present in extracted solvent waste water freed of solvent residues. The sump product of the deacidification column is fed through the conduit 12 and the heat exchanger 5 to the ammonia-removal column 2, which is not pressurized, and enters this column at a temperature of about 95°C. 11,600 kg driving steam is fed through the conduit 15 and the steam jet apparatus 14. The sump product of the column 2 is cooled in the evaporative cooler and 4900 kg steam is produced, so that a total of 16,500 kg steam is introduced into the column through the conduit 13.

5100 kg steam of the head product from the column 2 is condensed in the condenser 20 and refed to the top portion of the column 2 as a reflux condensate through the conduit 21. 5400 kg of condensate is withdrawn from the level 22 of the column 2 and contains about 3 weight percent $NH_3$ and 2.5 weight percent ($CO_2$ + $H_2S$). It is mixed with waste water fed through the conduit 4. 5000 kg of a mixture of 3600 kg steam, 1200 $NH_3$ and 200 kg ($CO_2$ + $H_2S$) are discharged from the condenser 20.

113,000 kg purified waste water is discharged from the evaporative cooler 3.

EXAMPLE 2

Solvent residues are removed from a waste water resulting from an extraction process and having a temperature of 50°C, in the column 31. About 1200 m³ (S.T.P.) boiler plant gas is used for every 100 m³ of waste water.

100 m³ waste water freed of solvent residues is fed through the conduit 40, heated in the heat exchanger 41 to a temperature of 70°C and fed to the column 32.

A head product is removed from the column 32 through the conduit 44 and condensed in the condensor 45. The condensate, in an amount of 10,000 kg, consists of 97% $H_2O$, 3% $NH_3$ and traces of $CO_2$ and is fed to the top portion of the column as a reflux through the conduit 46. 120,000 kg liquid consisting of 97% $H_2O$, 1.4% ($CO_2$ + $H_2S$) and 1.6% $NH_3$ is withdrawn from the level 42 of the column 32 by means of the pump 49 and fed through the conduit 48 and the heat exchanger 50 to the deacidification column 33 which is pressurized at a pressure of 6 atm.

The temperature of the sump product of the column 33 is kept at 150°C by means of the heater 51. 125,000 kg of the deacidified sump product is fed through the conduit 54 and the heat exchanger 50 back to the column 32 and enters the column 32 at a temperature of 105°C.

The temperature of the sump product of the column 32 is 100°C. The treated waste water is discharged through the conduit 57, the evaporative cooler 34 and the heat exchanger 41 and has a temperature of 85°C in the evaporative cooler 34.

The head product of the deacidification column 33 is washed in the aftertreatment zone 52 of the column 33 with 5000 kg cold water and 700 kg ($CO_2$ + $H_2S$) are removed through the conduit 53.

4900 kg of a mixture of 24.5% $NH_3$, 2% $CO_2$ and 73.5% steam are removed from the condensor 45 of the ammonia-removal column 32. This mixture can be reacted to eliminate $NH_3$ and released or used for other purposes.

We claim:
1. A process for the treatment of waste water containing carbon dioxide, hydrogen sulfide and ammonia in addition to a solvent residue produced by removing a solvent from the waste water of a gasification of degasification of coal, comprising the steps of:
   a. stripping the solvent residue from the waste water with a first gas to produce a waste water containing hydrogen sulfide, carbon dioxide and ammonia;
   b. driving carbon dioxide and hydrogen sulfide from the waste water produced in step (a) with steam in a further gas and scrubbing said further gas with water and combining the water resulting from the scrubbing with waste water from which the carbon dioxide and hydrogen sulfide were driven;
   c. removing ammonia from the combined water of step (b) by passing the latter downwardly through a column against a rising flow of steam;
   d. refluxing the steam rising from said column in a concentrating zone thereabove to increase the concentration of ammonia in said zone and produce a reflux of ammoniacal water; and
   e. withdrawing the ammoniacal water reflux laterally from said column below said concentrating zone.
2. The process defined in claim 1 wherein the waste water from step (a) is introduced into said concentrating zone above the point at which the reflux is laterally removed and is thereby combined in said reflux to form a mixture which is treated in step (b), step (b) being carried out under pressure in a further column having a sump, the liquid from said sump being introduced into the column in step (c) below the point at which the reflux is laterally withdrawn.

* * * * *